United States Patent
Rybicki et al.

[11] 3,790,254
[45] Feb. 5, 1974

[54] MICROSCOPE CONDENSER SERIES
[75] Inventors: Edward B. Rybicki, Buffalo; Milton H. Sussman, Amherst; Robert B. Tackaberry, Williamsville, all of N.Y.
[73] Assignee: American Optical Corporation, Southbridge, Mass.
[22] Filed: Sept. 7, 1972
[21] Appl. No.: 287,133

[52] U.S. Cl. .................. 350/183, 350/87, 350/220, 350/229
[51] Int. Cl. .......................................... G02b 21/08
[58] Field of Search.......... 350/220, 229, 38, 39, 87, 350/175 ML, 183

[56] References Cited
UNITED STATES PATENTS
3,137,761  6/1964  Conradi et al. ............... 350/220 X
3,421,808  1/1969  Gottlieb ........................ 350/87
3,679,287  7/1972  Takahashi et al. ............ 350/39 X

*Primary Examiner*—John K. Corbin
*Attorney, Agent, or Firm*—Alan H. Spencer; William C. Nealon; Bernard L. Sweeney

[57] ABSTRACT

A related series of interchangeable phase condensers of substantially the same focal length having compatible parfocality, but having different working distances. The series of condensers being of such a design that ordinary correction of the image plane is within at least two wave lengths of light; the condensers being well corrected for field aberration including coma, and pupil aberration including coma; said condensers having their respective pupil positions substantially external to the glass thereof. By "substantially external" is meant all of the condensers have their annulii, aperture stops and focal plane positions substantially coincident.

10 Claims, 3 Drawing Figures

MICROSCOPE CONDENSER SERIES

BACKGROUND OF THE INVENTION

It is common with certain types of microscopes to have a plurality of more or less interchangeable condensers. However, such a change in condensers with a given microscope has required or necessitated the change of phase annuli. According to the present invention, a series of related condensers is provided, the equivalent focal lengths of which, allow the same phase annuli to be used with all condensers.

In addition, significant aspects of this invention include that the condensers are well corrected for both field and pupil aberrations and of particular significance is that the pupil positions of each condenser in the series is external to the glass in a given said condenser.

The correction for both field and pupil aberrations is significant in that the condensers perform well for both phase and non-phase applications. For the non-phase application, only field correction is necessary. With the phase application, both field and pupil correction are necessary with the pupil correction being especially important. In the prior art special condensers were necessary on a given microscope for phase applications.

As mentioned above, the pupil positions of the various condensers in the series are external to the glass. This external pupil position is significant since it has been found desirable to place phase annuli as near as possible to the pupil position. This is accomplished with superior facility with an external pupil. In the prior art, the annuli was further removed from the focal plane, and significantly inferior phase performance was encountered.

OBJECTS OF THE INVENTION

Accordingly, it is among the objects of this invention to provide a series or group of cooperating microscope condensers usable with a single microscope.

Another object of the invention is to provide a series of interchangeable microscope condensers having the same focal lengths and being well corrected for both field and pupil aberrations.

And it is yet another object of the invention to provide a series of interchangeable microscope condensers in which the pupil positions are external to the glass of the respective condensers.

DRAWINGS

DESCRIPTION

According to this invention, there is provided, according to a preferred embodiment, a series of three interchangeable cooperatively designed microscope condensers. The exemplary condenser series includes one having an NA of 1.30, one having an NA of 0.90, and a long working distance condenser. In the tables given below, numerical values for a successful variation of the condensers just mentioned are given.

THE 1.30 NA CONDENSER

Figure 1:
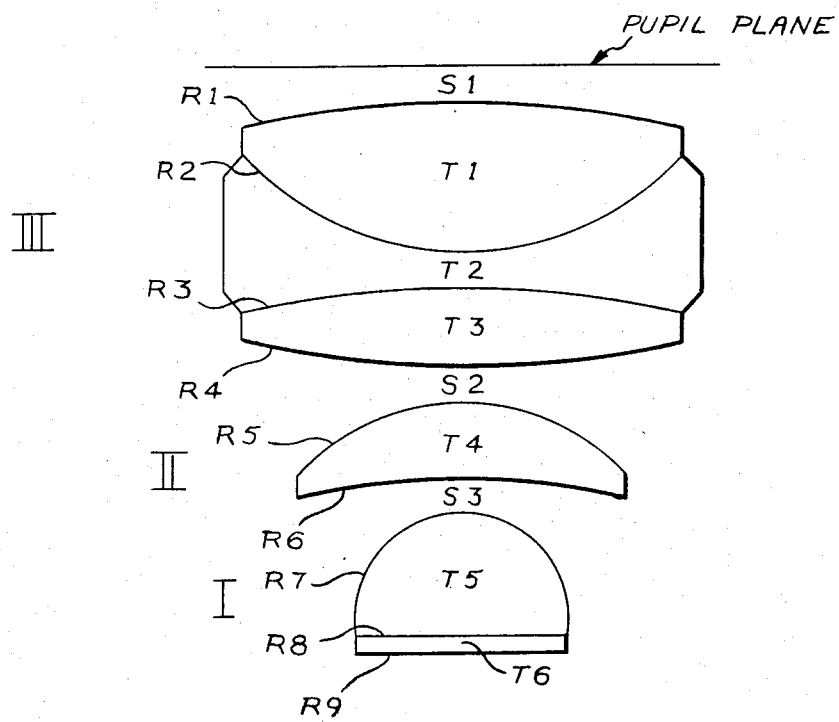
FIG. 1 is an optical diagram of one of a series of condensers according to this invention represented as an optical diagram of a condenser having an NA of 1.30.

This condenser as shown in FIG. 1 is a microscope sub-stage condenser, and in particular, an infinity corrected, achromatic, oil immersion condenser with a numerical aperture of substantially 1.30. It is corrected for field aberrations including coma. It is corrected for pupil aberrations, especially coma. Its pupil position is external to the glass and its focal length and parfocality are compatible with other condensers in the exemplary series herein described.

Referring to FIG. 1, where Roman numerals I, II, and III designate the three optically aligned components of said invention. Component I is a doublet composed of a plane parallel plate cemented to a hemispherical lens. Component II is a meniscus positive lens, followed by component III, a convex positive triplet.

The lens parameters are given with the following notations:

Axial thicknesses are designated T1 to T6,

Axial air separations are designated S1 to S3,

Lens radii are designated R1 to R9, where the minus sign (−) applies to surfaces whose center of curvature lies on the side of their vertices toward the pupil plane, Refractive indices are designated ND1 to ND6, and Abbe numbers are designated $\nu 1$ to $\nu 6$.

Numerically stated, the constructional data for one successful form of the invention is given in the chart below:

TABLE I

| Radius R | Thickness T | Space S | Refractive Index ND | Abbe Number $\nu$ |
|---|---|---|---|---|
| | | S1=1.178 | | |
| R1=42.234 | | | | |
| | T1=7.340 | | ND1=1.696800 | $\nu 1$=55.41 |
| R2=−22.204 | | | | |
| | T2=1.500 | | ND2=1.805182 | $\nu 2$=25.43 |
| R3=115.60 | | | | |
| | T3=2.680 | | ND3=1.696800 | $\nu 3$=55.41 |
| R4=−122.67 | | | | |
| | | S2=0.1100 | | |
| R5=14.820 | | | | |
| | T4=4.190 | | ND4=1.696800 | $\nu 4$=55.41 |
| R6=29.160 | | | | |
| | | S3=0.3000 | | |
| R7=7.2950 | | | | |
| | T5=8.650 | | ND5=1.617650 | $\nu 5$=55.14 |
| R8=PLANO | | | | |
| | T6=1.500 | | ND6=1.784701 | $\nu 6$=26.08 |
| R9=PLANO | | | | |

The foregoing parameters of radius, thickness, and spacings are functions of the equivalent focal length F of the condenser. In this preferred embodiment, the value of F, as an example is 9.67521 millimeters. In this focal length, the absolute value of the foregoing data is as follows:

TABLE II

| Radius R | Thickness T | Space S | Refractive Index ND | Abbe Number $\nu$ |
|---|---|---|---|---|
| | | S1=0.1218F | | |
| R1=4.3652F | | | | |
| | T1=0.7586F | | ND1=1.696800 | $\nu 1$=55.41 |
| R2=2.2949F | | | | |
| | T2=0.1550F | | ND2=1.805182 | $\nu 2$=25.43 |
| R3=11.948F | | | | |

R4=12.679F  T3=0.2770F  ND3=1.696800ν3=55.41
R5=1.5317F  S2=0.01137F
R6=3.0139F  T4=0.4331F  ND4=1.696800ν4=55.41
R7=0.75399F  S3=0.03101F
R8=PLANO  T5=0.8940F  ND 5=1.617650ν5=55.14
R9=PLANO  T6=0.1550F  ND6=1.784701ν6=26.08

THE LONG WORKING DISTANCE CONDENSER

As a second condenser in the preferred, yet exemplary series of condensers herein disclosed, there is a long working distance condenser. It is a microscope sub-stage condenser which is infinity corrected, achromatic, and dry. It is corrected for field aberrations, including coma, pupil aberrations, and has a working distance of substantially 5.5 millimeters in air. Its numerical aperture is substantially 0.65 and its pupil position, parfocality, and focal length are compatible with other condensers in the series herein disclosed.

Figure 2:
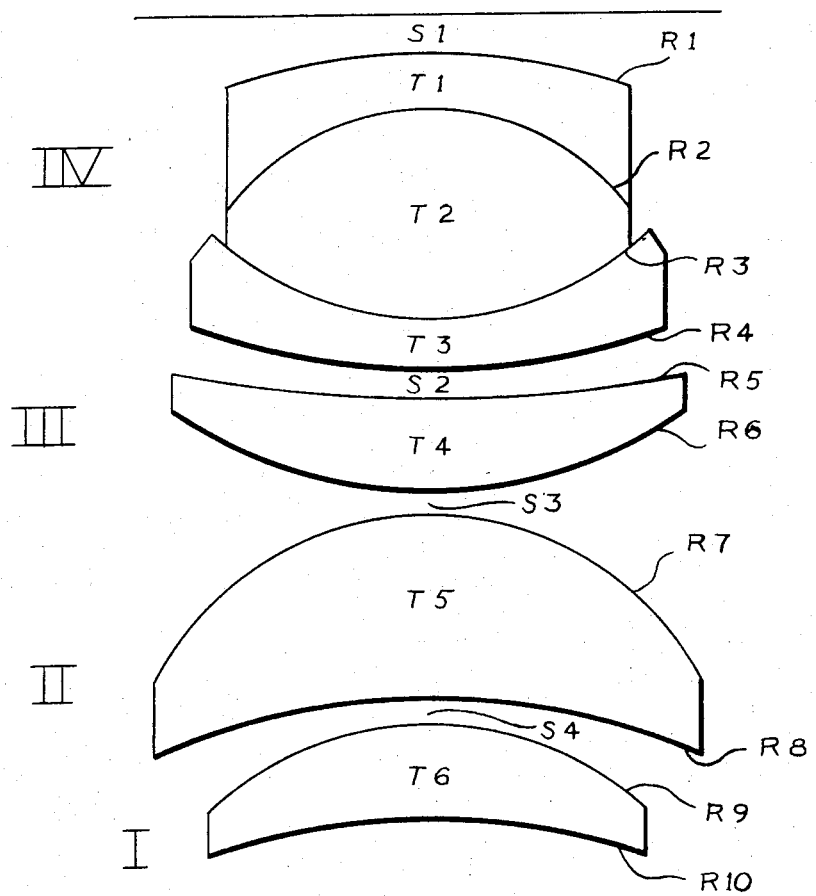
FIG. 2 is an optical diagram of one of a series of condensers according to this invention represented as an optical diagram of a condenser having a long working distance.

FIG. 2 is an optical diagram of the present invention, wherein numerals I, II, III, and IV designate the four optically aligned components of said invention. Components I, II, and III are meniscus positive lenses, while component IV is a convex negative triplet.

The lens parameters are given with the following notations:

Axial thicknesses are designated T1 to T6,

Axial air separations are designated S1 to S4, where the minus sign (−) indicates the two surfaces are shown in the opposite order in FIG. 2, Lens radii are designated R1 to R10, where the minus sign applies to surfaces whose center of curvature lies on the side of their vertices toward the pupil plane, Refractive indices are designated ND1 to ND6, and Abbe numbers are designated ν1 to ν6.

Numerically stated, the constructional data for one successful form of the invention is given in the chart below.

TABLE III

| Radius R | Thickness T | Space S | Refractive Index ND | Abbe Number ν |
|---|---|---|---|---|
|  |  | S1=0.129 |  |  |
| R1=100.00 |  |  |  |  |
|  | T1=1.500 |  | ND1=1.96051 | ν1=34.90 |
| R2=10.000 |  |  |  |  |
|  | T2=6.650 |  | ND2=1.60310 | ν2=65.34 |
| R3=11.414 |  |  |  |  |
|  | T3=1.500 |  | ND3=1.96051 | ν3=34.90 |
| R4=−39.829 |  |  |  |  |
|  |  | S2=0.0500 |  |  |
| R5=−317.33 |  |  |  |  |
|  | T4=4.690 |  | ND4=1.69680 | ν4=55.39 |
| R6=−19.306 |  |  |  |  |
|  |  | S3=0.0500 |  |  |
| R7=15.303 |  |  |  |  |
|  | T5=6.500 |  | ND5=1.69680 | ν5=55.39 |
| R8=27.190 |  |  |  |  |
|  |  | S4=0.0500 |  |  |
| R9=9.660 |  |  |  |  |
|  | T6=5.225 |  | ND6=1.69680 | ν6=55.39 |
| R10=50.000 |  |  |  |  |

The foregoing parameters of radius, thickness, and spacings are functions of the equivalent focal length F of the condenser. In this preferred embodiment, the value of F, as an example, is 9.67528 millimeters. In this focal length, the absolute value of the foregoing data is as follows:

TABLE IV

| Radius R | Thickness T | Space S | Refractive Index ND | Abbe Number ν |
|---|---|---|---|---|
|  |  | S1=0.01333 |  |  |
| R1=10.336F |  |  |  |  |
|  | T1=0.1550 |  | ND1=1.96051 | ν1=34.90 |
| R2=1.0336F |  |  |  |  |
|  | T2=0.6873 |  | ND2=1.60310 | ν2=65.34 |
| R3=1.1797F |  |  |  |  |
|  | T3=0.1550 |  | ND3=1.96051 | ν3=34.90 |
| R4=−4.1166F |  |  |  |  |
|  |  | S2=0.005167 |  |  |
| R5=−32.798F |  |  |  |  |
|  | T4=0.4847 |  | ND4=1.69680 | ν4=55.39 |
| R6=−1.9954F |  |  |  |  |
|  |  | S3=0.005167 |  |  |
| R7=1.5817F |  |  |  |  |
|  | T5=0.6718 |  | ND5=1.69680 | ν5=55.39 |
| R8=2.8103F |  |  |  |  |
|  |  | S4=0.005167 |  |  |
| R9=0.9984F |  |  |  |  |
|  | T6=0.5400 |  | ND6=1.69680 | ν6=55.39 |
| R10=5.1678F |  |  |  |  |

THE 0.90 NA CONDENSER

Figure 3:
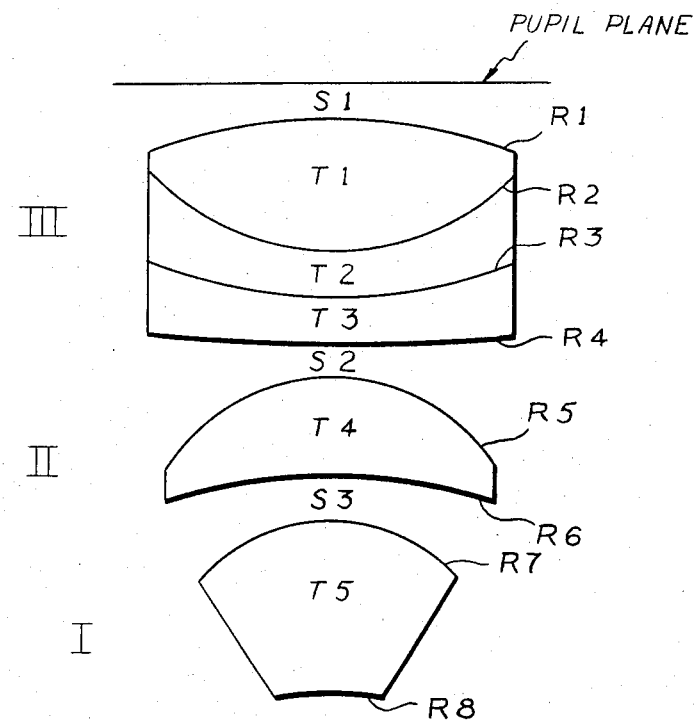
FIG. 3 is an optical diagram of one of a series of condensers according to this invention represented as an optical diagram of a condenser having an NA of 0.90.

The condenser as shown in FIG. 3 is a microscope sub-stage condenser, and in particular, an infinity corrected, achromatic, dry condenser, with a numerical aperture of substantially 0.90. It is corrected for field aberrations, including coma. It is also corrected for pupil aberrations, especially coma. Its pupil position is external to the glass and its focal length and parfocality are compatible with other condensers in the exemplary series herein described.

FIG. 3 is an optical diagram of the present invention, wherein numerals I, II, and III designate the three optically aligned components of said invention. Component I is a meniscus positive lens, as is component II. Component III is a convex positive triplet.

The lens parameters are given with the following notations:

Axial thicknesses are designated T1 to T5,

Axial air separations are designated S1 to S3,

Lens radii are designated R1 to R8, where the minus sign (−) applies to surfaces whose center of curvature lies on the side of their vertices toward the pupil plane, Refractive indices are designated ND1 to ND5, and Abbe numbers are designated ν1 to ν5.

Numerically stated, the constructional data for one successful form of the invention is given in the chart below:

TABLE V

| Radius R | Thickness T | Space S | Refractive Index ND | Abbe Number ν |
|---|---|---|---|---|
|  |  | S1=1.300 |  |  |
| R1=39.784 |  |  |  |  |
|  | T1=8.440 |  | ND1=1.69680 | ν1=55.39 |
| R2=10.826 |  |  |  |  |
|  | T2=2.500 |  | ND2=1.80518 | ν2=25.43 |
| R3=−28.936 |  |  |  |  |
|  | T3=1.600 |  | ND3=1.69680 | ν3=55.39 |
| R4=−98.903 |  |  |  |  |
|  |  | S2=0.1100 |  |  |
| R5=11.042 |  |  |  |  |
|  | T4=5.650 |  | ND4=1.69680 | ν4=55.39 |
| R6=27.512 |  |  |  |  |
|  |  | S3=0.3000 |  |  |
| R7=7.505 |  |  |  |  |
|  | T5=7.512 |  | ND5=1.56384 | ν5=60.82 |
| R8=50.046 |  |  |  |  |

The foregoing parameters of radius, thickness, and spacings are functions of the equivalent focal length F of the condenser. In this preferred embodiment, the value of F, as an example is 9.67529 millimeters. In this focal length, the absolute value of the foregoing data is as follows:

TABLE VI

| Radius R | Thickness T | Space S | Refractive Index ND | Abbe Number $\nu$ |
|---|---|---|---|---|
| | | S1=0.1344F | | |
| R1=4.1119F | | | | |
| | T1=0.8723F | | ND1=1.69680 | $\nu$1=55.39 |
| R2=−1.1189F | | | | |
| | T2=0.2584F | | ND2=1.80518 | $\nu$2=25.43 |
| R3=−2.9907F | | | | |
| | T3=0.1654F | | ND3=1.69680 | $\nu$3=55.39 |
| R4=−10.222F | | | | |
| | | S2=0.01137F | | |
| R5=1.1413F | | | | |
| | T4=0.5840F | | ND4=1.69680 | $\nu$4=55.39 |
| R6=2.8435F | | | | |
| | | S3=0.0310F | | |
| R7=0.77569F | | | | |
| | T5=0.7764 F | | ND5=1.56384 | $\nu$5=60.32 |
| R8=5.1726F | | | | |

In the foregoing tables, negative signs represent concave radii going from left to right.

In the whole description, we have emphasized that the annuli, aperture stops and pupil positions are "substantially coincident." As will be recognized by those skilled in the art, this means that when the condensers are utilized in a contrast enhancing system, the annuli identically placed below and exterior to any of the aforementioned condensers are imaged so coincident that common (meaning "same") retardation plates or spatial filtering devices may be used.

It should be understood by those skilled in the art that the lens data is accurate within about ± 3 percent in the second decimal place.

Having thus described the invention in detail and with sufficient particularity to enable those skilled in the art to practice it, what is desired to have protected by Letters Patent is set forth in the following claims.

What is claimed is:

1. A related series of interchangeable phase condensers of substantially the same focal length having compatible parfocality, but having different working distances, the series of condensers being of such a design that ordinary correction of the image plane is within at least two wave lengths of light; the condensers being well corrected for field aberration including coma, and pupil aberration including coma; said condensers having their respective pupil positions external to the glass thereof in a light path through a given condenser in the series and each condenser comprising at least three lens components, the last of said lens components being a double convex triplet and the second of said lens components being a meniscus positive lens.

2. A microscope condenser in a series according to claim 1 having a numerical aperture of 1.30 and composed of the following components:
   a first component I comprised of a doublet composed of a plane parallel plate cemented to a hemispherical lens;
   a second component II comprised of a meniscus positive lens; and
   a third component III, composed of a convex positive triplet.

3. The microscope condenser of claim 2 in which the parameters of lens radii (R), thicknesses (T), and spacings (S) are expressed in millimeters and a negative sign indicates lens radii on centers of curvature on the object side of the lens

TABLE II

| Radius R | Thickness T | Space S | Refractive Index ND | Abbe Number $\nu$ |
|---|---|---|---|---|
| | | S1=0.1218F | | |
| R1=4.3652F | | | | |
| | T1=0.7586F | | ND1=1.696800 | $\nu$1=55.41 |
| R2=2.2949F | | | | |
| | T2=0.1550F | | ND2=1.805182 | $\nu$2=25.43 |
| R3=11.948F | | | | |
| | T3=0.2770F | | ND3=1.696800 | $\nu$3=55.41 |
| R4=12.679F | | | | |
| | | S2=0.01137F | | |
| R5=1.5317F | | | | |
| | T4=0.4331F | | ND4=1.696800 | $\nu$4=55.41 |
| R6=3.0139F | | | | |
| | | S3=0.03101F | | |
| R7=0.75399F | | | | |
| | T5=0.8940F | | ND5=1.617650 | $\nu$5=44.14 |
| R8=PLANO | | | | |
| | T6=0.1550F | | ND6=1.784701 | $\nu$6=26.08 |
| R9=PLANO | | | | |

4. The microscope condenser of claim 3 in which F=9.67521.

5. A microscope condenser in a series according to claim 1 having a working distance of substantially 5.5 millimeters in air, and a numerical aperture of substantially 0.65 and composed of the following components:

a first, second, and third component I, II, and III, each comprised of a meniscus positive lens, and
   a fourth component IV, comprised of a convex negative triplet.

6. The microscope condenser of claim 5 in which the parameters of lens radii (R), thicknesses (T) and spacings (S) are expressed in millimeters and a negative sign indicates lens radii on centers of curvature on the object side of the lens

TABLE IV

| Radius R | Thickness T | Space S | Refractive Index ND | Abbe Number $\nu$ |
|---|---|---|---|---|
| | | S1=−0.01333 | | |
| R1=10.336F | | | | |
| | T1=0.1550 | | ND1=1.96051 | $\nu$1=34.90 |
| R2=1.0336F | | | | |
| | T2=0.6873 | | ND2=1.60310 | $\nu$2=65.34 |
| R3=−1.1797F | | | | |
| | T3=0.1550 | | ND3=1.96051 | $\nu$3=34.90 |
| R4=−4.1166F | | | | |
| | | S2=0.005167 | | |
| R5=−32.798F | | | | |
| | T4=0.4847 | | ND4=1.69680 | $\nu$4=55.39 |
| R6=−1.9954F | | | | |
| | | S3=0.005167 | | |
| R7=1.5817F | | | | |
| | T5=0.6718 | | ND5=1.69680 | $\nu$5=55.39 |
| R8=2.8103F | | | | |
| | | S4=0.005167 | | |
| R9=0.9984F | | | | |
| | T6=0.5400 | | ND6=1.69680 | $\nu$6=55.39 |
| R10=5.1678F | | | | |

7. The microscope condenser of claim 6 in which F=9.67528.

8. A microscope condenser in a series according to claim 1 having a numerical aperture of 0.90 and composed of the following components:
   a first and second component I, and II, comprised of a meniscus positive lens, and
   a third component III comprised of a convex positive triplet.

9. The microscope condenser of claim 8 in which the parameters of lens radii (R), thicknesses (T), and spacings (S) are expressed in millimeters and a negative sign indicates lens radii on centers of curvature on the object side of the lens

TABLE VI

| Radius R | Thickness T | Space S | Refractive Index ND | Abbe Number $\nu$ |
|---|---|---|---|---|
| | | S1=0.1344F | | |
| R1=4.1119F | | | | |
| | T1=0.8723F | | ND1=1.69680 | $\nu$1=55.39 |
| R2=−1.1189F | | | | |
| | T2=0.2584F | | ND2=1.80518 | $\nu$2=25.43 |
| R3=−2.9907F | | | | |
| | T3=0.1654F | | ND3=1.69680 | $\nu$3=55.39 |
| R4=−10.222F | | | | |
| | | S=0.01137F | | |
| R5=1.1413F | | | | |
| | T4=0.5840F | | ND4=1.69680 | $\nu$4=55.39 |
| R6=2.8435F | | | | |
| | | S3=0.0310F | | |
| R7=0.77569F | | | | |
| | T5=0.7764F | | ND5=1.56384 | $\nu$5=60.32 |
| R8=5.1726F | | | | |

10. The microscope condenser of claim 9 in which F=9.67529.

* * * * *